United States Patent
Webb

(10) Patent No.: US 6,895,187 B1
(45) Date of Patent: May 17, 2005

(54) BRANCHING UNIT AND SYSTEM FOR UNDERWATER OPTICAL COMMUNICATION

(75) Inventor: Stephen Michael Webb, Kent (GB)

(73) Assignee: Alcatel, Paris (FR)

(*) Notice: Subject to any disclaimer, the term of this patent is extended or adjusted under 35 U.S.C. 154(b) by 577 days.

(21) Appl. No.: 09/699,381

(22) Filed: Oct. 31, 2000

(30) Foreign Application Priority Data

Nov. 1, 1999 (GB) .............................. 9925866

(51) Int. Cl.⁷ .............................................. H04B 10/00
(52) U.S. Cl. ........................... 398/104; 398/105; 398/2; 307/126; 361/191
(58) Field of Search ................... 398/45, 82, 104–105, 398/141, 2, 5; 307/126; 361/191

(56) References Cited

U.S. PATENT DOCUMENTS

| | | | | |
|---|---|---|---|---|
| 5,517,383 A | | 5/1996 | Webb | ........................ 361/191 |
| 5,526,157 A | * | 6/1996 | Kawano | ........................ 398/1 |
| 5,532,478 A | * | 7/1996 | Kogure | .................. 250/227.24 |
| 5,594,581 A | * | 1/1997 | Alphonsus | ..................... 398/6 |
| 5,841,205 A | | 11/1998 | Webb | ........................ 307/130 |
| 6,166,836 A | * | 12/2000 | Crameri et al. | ............... 398/18 |
| 6,249,620 B1 | * | 6/2001 | Simeonidou et al. | ......... 385/16 |
| 2002/0057477 A1 | * | 5/2002 | Rocca et al. | ................ 359/141 |

FOREIGN PATENT DOCUMENTS

EP     0 635 950 A1    1/1995

\* cited by examiner

Primary Examiner—Kinfe-Michael Negash
(74) Attorney, Agent, or Firm—Sughrue Mion, PLLC

(57) ABSTRACT

A branching unit, for use in optical communication systems, has three branches A, B and C each including a connection for a power feed and several inputs/outputs for optical fibers. Optical switches are provided for selectively coupling inputs/outputs of different branches to enable a routeing of optical signals through the unit. The routeing is effected in dependence upon the way in which each of the three branch connections are provided with an electrical power feed.

11 Claims, 5 Drawing Sheets

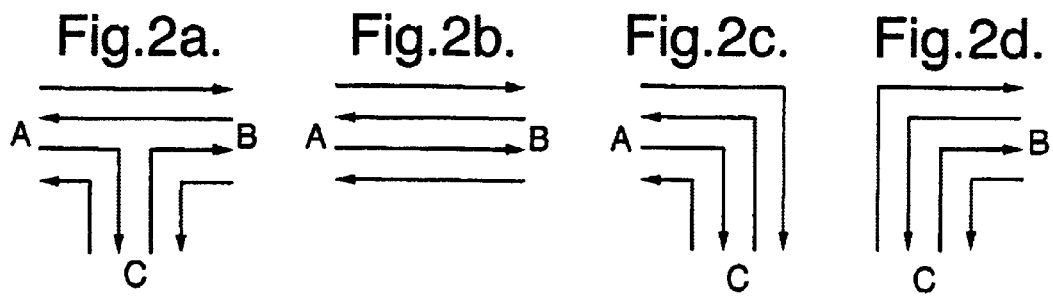
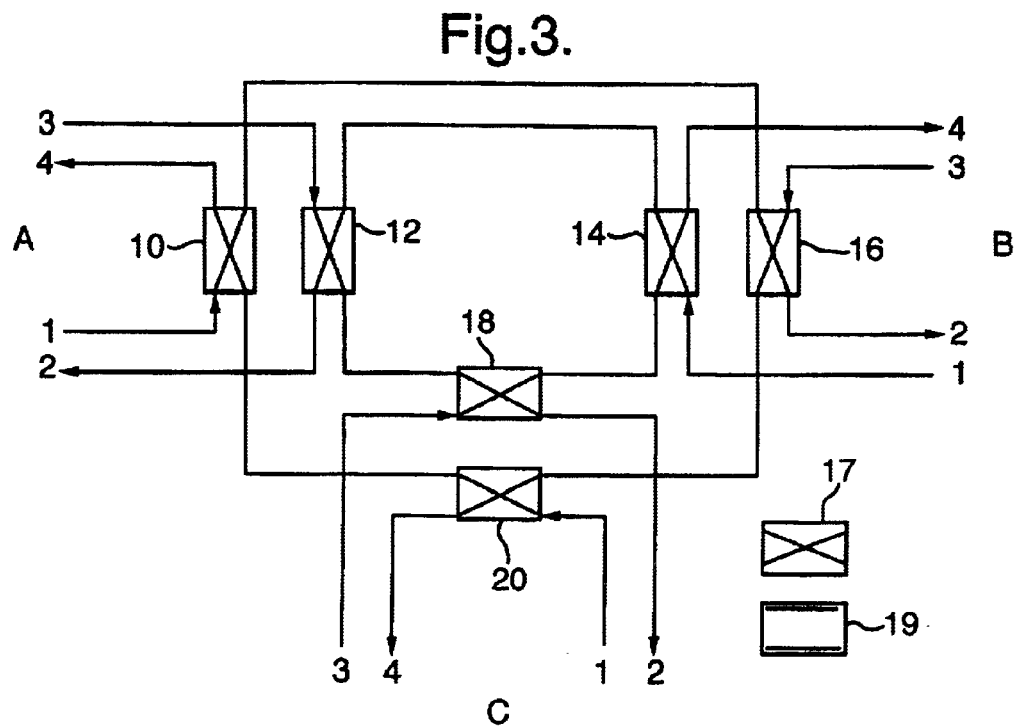

Fig.5a. 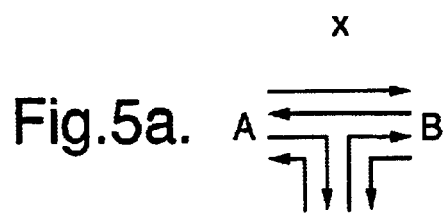 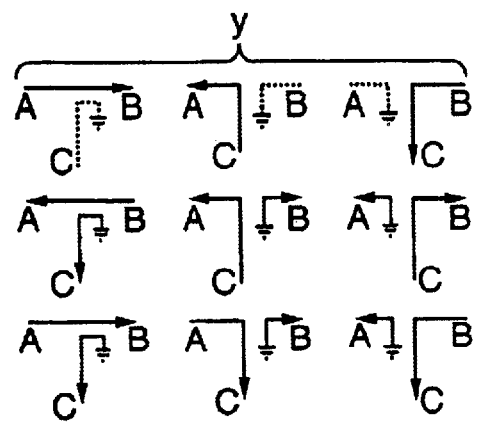
Fig.5b. 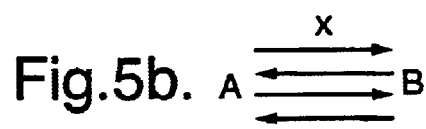 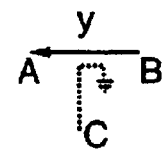
Fig.5c. 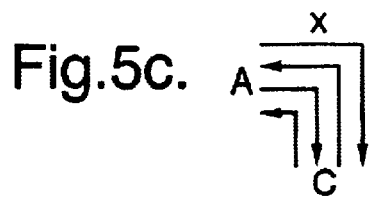 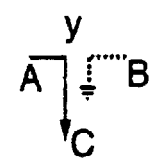
Fig.5d. 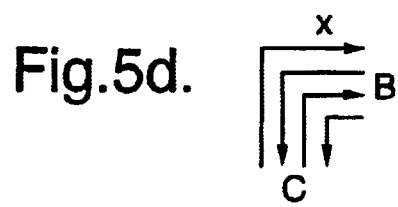 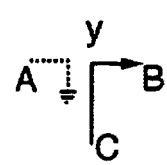

BRANCHING UNIT AND SYSTEM FOR UNDERWATER OPTICAL COMMUNICATION

BACKGROUND OF THE INVENTION

This invention relates to a branching unit and system for underwater communication in which optical signals can be selectively routed between branches.

Branching units for underwater optical communication systems normally have three branches and are normally arranged to through-couple one fibre pair connected to one branch to a fibre pair on another branch, which fibre pairs form a main highway for optical data signals. In order to route specific signals to a spur terminal connected to another branch such signals are propagated with a specific wavelength and can be diverted to the other branch by means of a wavelength division multiplex system (WDM) which also permits signals to be sent from the spur terminal and to be injected at the specific wavelength into the main highway. This system is effective but does not permit maximum usage of the optical capacity of the main highway if no traffic is required to or from the spur terminal and does not permit selective access of the spur terminal to the main highway. The present invention has been arrived at from a consideration of these deficiencies and seeks to provide a branching unit which enables selective routing of optical signals between branches of a branching unit and also an optical transmission system employing such branching units.

In EP-A-635950 there is disclosed a branching unit in which various switching modes can be achieved by activation or inactivation of erbium doped fibre amplifiers (EDFA's) permanently installed in each fibre and which when activated overcome the effect of an optical attenuator in series with it in that fibre. The various EDFA's are powered from the sources which are powering the various optical cables, through bridge-type rectifier circuits.

SUMMARY OF THE INVENTION

The present invention achieves the same optical switching modes but in a much simpler way.

It does so using an electrical circuit which resembles in many ways that seen in FIG. 4 of U.S. Pat. No. 5,841,205. However, that circuit does not carry out any optical switching but is simply to provide power for respective in-line signal boosters (e.g. regenerators or amplifiers) for the various cables.

That Figure is repeated here as FIG. 1, and a description of it is repeated from U.S. Pat. No. 5,841,205, as follows:

FIG. 1 shows three rectifier bridges, one around each of the relay coils A, B, C. These rectifier bridges ensure that no matter which direction current flows (between the terminal) the coil energizing current is always unipolar, and they also help to increase relay dropout time via the flywheel effect. Under fault conditions, current flow through the branching unit may suddenly reverse as the cable discharges into a short circuit. This reversed process may be quite slow for distant faults, thus there is a time when an actuated relay is starved of current and, furthermore, it must remagnetise with the opposite polarity. In short, the relay may unswitch and connect the spur cable to the main trunk cable causing a high current surge that may damage the relay, depending on the voltage at the time. Additionally, the coil bridges act as "flywheels". Removal of current supply will cause a coil to generate a back voltage, the polarity of which is conducted by the bridge diodes. The diode conduction will further prolong the magnetic field decay and thus the dropout time of the relay. This damping effect is sufficient to hold a relay in during the line current reversal and so prevent a grounded spur being connected to the trunk line. Due to the inclusion of the bridge diodes around the relay coils A, B, C, linearity bypass resisters 130 are included across each of them, since at low supply voltages these bridge diodes will not conduct.

There are four power demand circuits in the form of regenerators 120 in the illustrated arrangement, although this is not the only possibility, with their power feed circuits connected in series. A respective zener diode 121 is connected across (in parallel with) each regenerator 120 and limits supply voltage to the regenerator, the four zener diodes 121 being connected in series. The arrangement of four zener diodes 121 is in effect disposed in parallel with each relay coil A, B and C.

Three pairs 122, 123 and 124 of rectifier diodes 125A–125F, conducting in the same directions, are disposed in parallel with the series connections of regenerators and zener diodes. One pair of rectifier diodes is associated with each branch cable terminal. The junction 126 to which both coils B and C are connected is connected to a point between the rectifier diodes of pair 122, the junction 127 between coils A and B is connected to a point between the rectifier diodes of pair 123, and the junction 128 to which both coils A and C are connected is connected to a point between the rectifier diodes of pair 124. As will be appreciated, associated with each coil A, B and C, is a respective pair of the pairs of rectifier diodes 122, 123 and 124. For example, coil C is associated with diode pairs 122 and 124, and the four diodes of these two pairs are arranged as a rectifier bridge. The line terminal 101 and 103 and the coil C are connected across the pair of the bridge's terminals and the regenerators 120 and zener diodes 121 are connected across the other pair of the bridge's terminals.

When a voltage is applied between two stations such that, for example, current flows between terminals 101 and 103, terminal 102 is connected to the line A1 B1 and when the current flow through the relay coil D is raised above 800 ma the relay is actuated and the terminal 102 is connected to the sea earth. In addition, current flows from junction 126 through rectifier diode 125A, the series connections of regenerators 120 and zener diodes 121, and rectifier diode 125F to junction 128 and thence to terminal 103.

Hence the regenerator powerfeed circuits are effectively put in series with the leg through which the current is being supplied and in which terminals (101 and 103 in this example) are connected and hence current is always supplied to the regenerators. If current flow is between terminals 101 and 102 and terminal 103 is connected to the sea earth when contacts D1 are changed over, current flows through rectifier diode 125A, the regenerators 120 and zener diodes 121 and rectifier diode 125D to junction 127 and thence to terminal 102. If terminals 102 and 103 are connected and terminal 101 is connected to the sea earth when contacts D1 are changed over and current flow is from terminal 102 to terminal 103, it also flows from junction 127 through rectifier diode 125C, the regenerators 120 and zener diodes 121 and rectifier diode 125F to junction 128. If the current flow is reversed e.g. with the last case, but flow is from terminal 103 to terminal 102, current flows from junction 128, through rectifier diode 125E, the regenerators 120 and the zener diode 125D to junction 127 and thence to terminal 102. The arrangement is symmetrical and reversible and achieves the requirement of supplying current to the regenerators irrespective of which two terminals (arms or branches of the system) are powered and irrespective of the current flow direction.

Considering current applied between terminals 101 and 103, relay coil C sees double the voltage of the coils A and B, which means that the C relay is capable of switching its contacts C1, but the A and B relays are not capable of switching their contracts A1 and B1 as they only have half of the voltage. The four zener diodes 121 simultaneously offer surge protection to the regenerators 120, relay coils A, B, C and the rectifier diodes, i.e. protection during current transients. These may occur such as when the cable is cut, it shorts out to the seawater and very large currents (300–400 amps) can flow. So by having the zener diodes 121 in parallel with the regenerators 120 they limit the voltage across the regenerators 120, as well as across the relay coils A, B, C. So the system is totally internally surge protected. In addition, surge protection coils 129 are included between the terminals 101, 102, 103 and the junctions 126, 127, 128 to lengthen the rise time in the event of a nearby short circuit fault and to provide a smaller transient over a longer time than otherwise. The surge protection coils 129 thus limit inductive voltage spikes between regenerators 120 and across the rectifier diodes 121 and relay coils A, B, C during current transients.

For cable fault finding purposes at low line currents, it is necessary to have a dc path with defined resistance. The resistors 130 provide such a path since at lower power feed voltages, the rectifier bridge will not conduct significantly.

Illustrated in FIG. 1 between the sea earth and the contacts A1, B1 and C1 is the further relay contact D1 referred to above, associated with further relay coil D. The D relay isolates the spur from ground until it has been discharged by the terminal station.

A circuit is seen in FIG. 4 and as seen there differs in ways explained below; in particular by additional relay contacts for bringing into circuit activating means of the optical switches.

In contrast to the prior art, in the present invention means for actuating an optical switch are switched into or isolated from respective circuits in accordance with the overall powering condition in the optical cables; and preferably the optical switches are such as to offer according to their state alternative paths through the switch to two pairs of optical fibre lines in each branch.

According to one aspect of the invention there is provided a branching unit, for use in optical communication systems, having three branches each including a connection for a power feed and a plurality of paired inputs and outputs for respective pairs of optical fibre lines, wherein optical switching means is provided for selectively coupling the inputs and outputs of different branches to enable routeing of optical signals through the unit between different branches in dependence upon the way in which each of the three branch connections are provided with an electrical power feed.

Preferably, the branching unit is arranged such that each branch comprises four inputs/outputs for connection of two fibre line pairs and the optical switching means permits selective coupling of all four input/outputs of one branch in pairs to corresponding output/inputs of either one of the other branches.

The optical switching means may permit selective coupling of two input/outputs of a first branch to two output/inputs of a second or third branch and the other two input/outputs of the first branch to the output/inputs of a third or second branch respectively.

The arrangement may be such that selective switching of the optical switching means changes between a first configuration where all four inputs/outputs of a first branch are coupled to corresponding output/inputs of a second branch and a second configuration where two inputs/outputs of the first branch are coupled to two corresponding outputs/inputs of a third branch and the other two input/outputs of the first branch are coupled to two corresponding outputs/inputs of the second branch can be effected in dependence upon the direction of current feed between first and second branches.

Preferably the optical switching means includes optical switches each having two inputs and two outputs with an input and output pair at each side of the switch and operative to connect the respective pairs in two different routeings.

For example, there may be provided two such optical switches for each branch, each having four input/outputs, the first and second of which are optically coupled to a different one of the optical input/outputs of the branch and the third and fourth of which are optically coupled to a third input/output of different ones of the optical switches of the other two branches such that the optical switches can selectively optically couple each input and output for a fibre pair line of one branch to a corresponding output and input of either one of the other branches. This is illustrated in FIG. 3.

The optical switches may be arranged such that, in a default configuration, in each branch each pair of input/outputs for a fibre pair are coupled to the output/inputs for a fibre pair of a different one of the other two branches.

The optical switches may be Opti-video, JD5 or other commercially available switches which are electrically powered to an energized optical condition but when unpowered revert to a default optical condition different from the energized one.

According to another aspect of the invention there is provided an optical communication system, comprising an optical fibre trunk cable coupled between remote terminal locations and provided with a plurality of branching units at spaced locations therealong, which branching units are linked via optical fibre cable to individual terminal locations, wherein the optical fibre trunk cable and optical fibre linking cable incorporates an electrical conductor for supplying power from the terminals to the branching units and wherein the branching units are as defined above.

BRIEF DESCRIPTION OF THE DRAWINGS

In order that the invention and its various other preferred features may be understood more easily, some embodiments thereof will now be described, by way of example only, with reference to the drawings, in which:

FIGS. 2a to 2d illustrate schematically some possible alternative routeings for a two fibre pair branching unit;

FIG. 3 illustrates schematically an optical circuit for a two fibre pair branching unit constructed in accordance with the invention;

FIGS. 5a to 5d are schematic illustrations showing alternative possible optical routeings with line current direction.

DETAILED DESCRIPTION OF THE INVENTION

Figure 1:
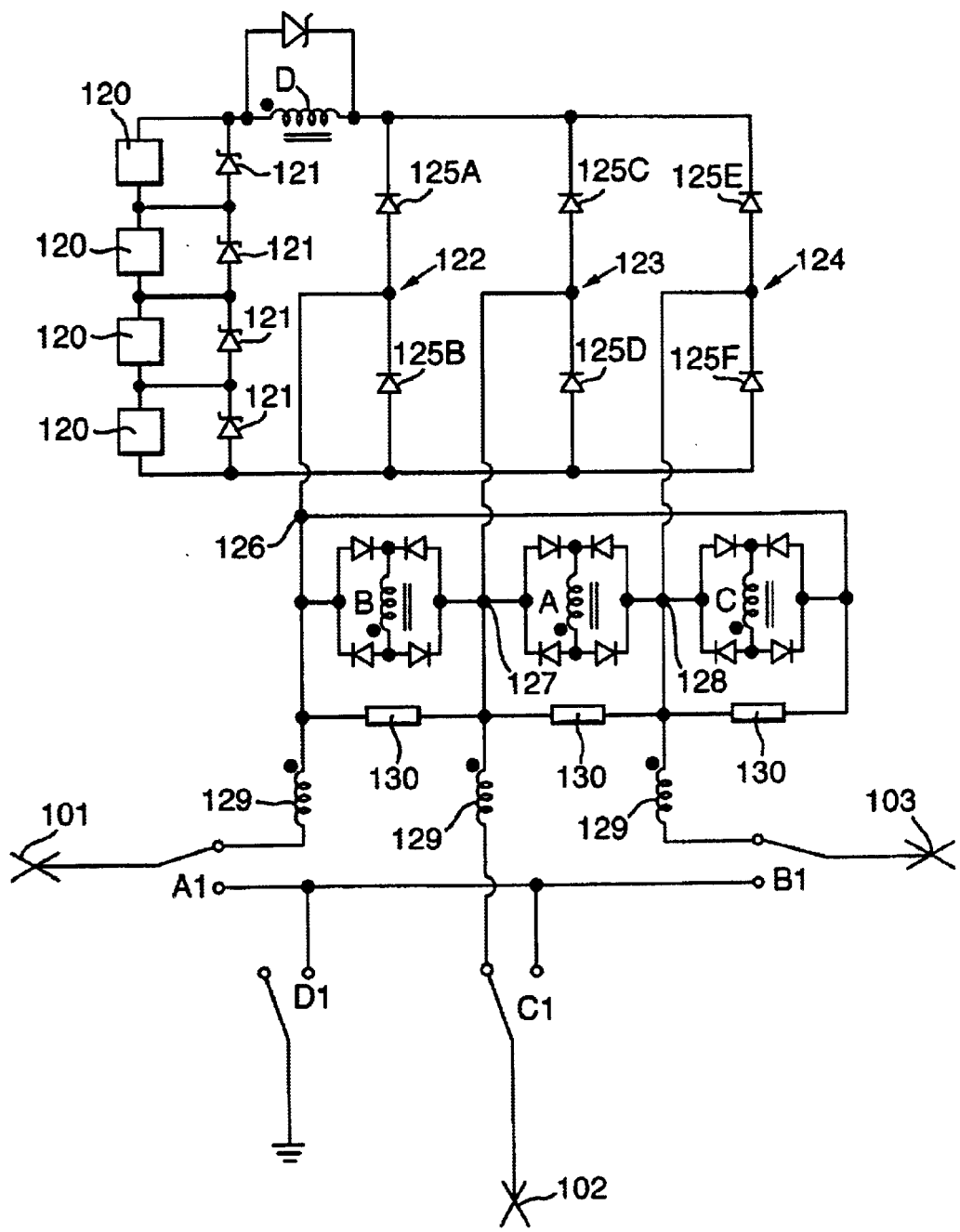

Referring now to FIG. 2, there is shown various possible routeings of a basic two-fibre-pair branching unit having branches A, B and C. In FIG. 2a there is shown a default configuration where one pair of inputs/outputs on branch A are optically routed directly to a first pair of corresponding output/inputs of branch B—the so-called fast data path for connection in the main data highway of a communication system. A second pair of inputs/outputs on branch A are optically routed to a corresponding first pair of output/inputs of branch C whilst branch C has a second pair of input/outputs which are routed to a corresponding second pair of output/inputs of branch B. This forms a so-called slow data path for communication between branch A and B via C.

The present invention seeks to permit optimal usage of the fibers in dependence upon traffic requirement and destinations and under fault conditions due to cable damage. In the event of no traffic requirement between A or B and C then utilisation of both fibre pairs connected to branch A for transmission along a main data highway to two corresponding fibre pairs connected to branch B is envisaged by optical switching to provide the routeing configuration of FIG. 2b. Alternative optical routeing configuration are also possible to route the two pairs of inputs/outputs on branch A to the two pairs of outputs/inputs of branch C (FIG. 2c) or to route the two pairs of inputs/outputs on branch B to the two pairs of outputs/inputs on branch C (FIG. 2d) in, for example, fault conditions in the fibre path connected to branch B or A respectively.

In a large multiple branching unit system where branching units are provided in succession along a main data highway to provide branches to specific locations, it is possible using these branching units, to reconfigure traffic to use all the fibers between any pair of destinations. This is particularly useful if there is a breakdown of a spur terminal or the fibers feeding a spur terminal are severed, as the spur can be isolated by a traffic bypass. Alternatively, if a fault occurs in the main highway or trunk, the fast trunk fibers can be diverted to the spurs ready for possible back-haul restoration. Such an optical circuit makes the maximum usage of all optical fibres under all fault scenarios.

Referring now to FIG. 3, there is shown an optical circuit for a two-fibre-pair branching unit. The circuit comprises six 2×2 change-over switches 10,12,14,16,18,20 of a non-latching type. Such switches can be designed with the virtue of very low loss, theoretically a high reliability and are optically fail safe, i.e. they will not completely stop working. The switches are shown in the default configuration and the routeing is such that a first pair of input/outputs 1 and 2 of branch A are routed via switches 10,16 and 12,14 to a first pair of outputs/inputs 2 and 1 respectively of branch B, a second pair of input/outputs 3 and 4 of branch A are routed via switches 12,18 and 10,20 to a first pair of output/inputs 2 and 1 respectively of branch C, whilst a second pair of inputs/outputs 3 and 4 of branch B are routed via switches 16,20 and 14,18 to a second pair of output/inputs 4 and 3 respectively of branch C. Bypass operation is effected by actuation of pairs of switches 10,12 or 14,16 or 18,20. The actuated, or energized, configuration of a switch is shown at 19 at the bottom right-hand side of FIG. 3. This gives a straight-through connection between inputs and outputs. In the non-energized or default condition seen in the main Figure and at 17, there is a cross-over connection through the switch.

By way of example the routeing which occurs will now be described when switches 18 and 20 are actuated. Here, the first and second pairs of inputs/outputs 1,2 and 3,4 of branch C are isolated from the main circuit and the second pair of input/outputs 3,4 of branch A are routed via switches 12,18, 14 and 10,20,16 to the second pair of output/inputs 4 and 3 respectively of branch B. In this way two pairs of fibres are available in the main data highway, or trunk, for transmission of signals. The routeings which result from switches of pairs of switches 10,12 or 14,16 will not be described in detail, but it will be appreciated that bypass of any one of the branches, i.e. any of the configurations of FIG. 2, can be effected by appropriate actuation or non-actuation of the switches.

Figure 4:
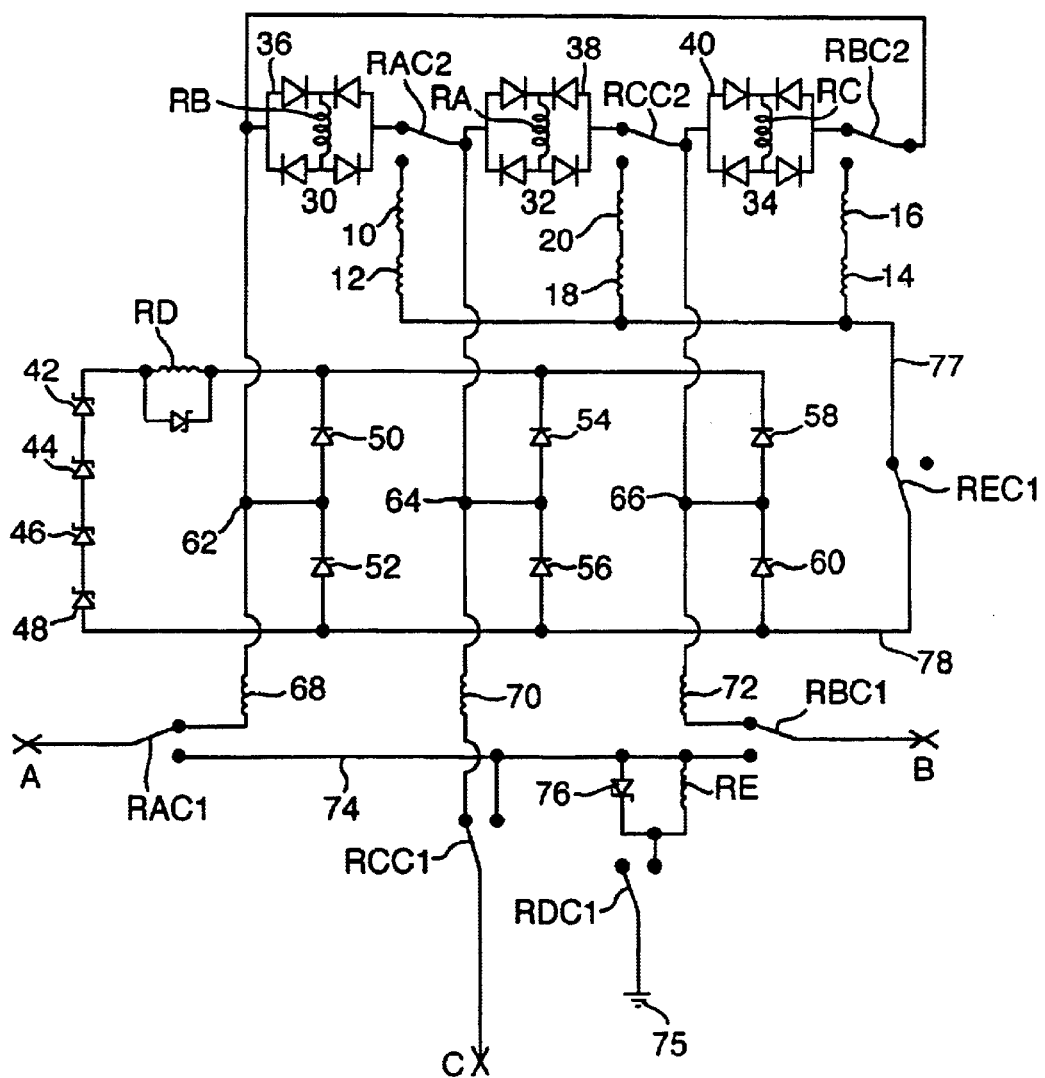
FIG. 4 is a schematic simplified electrical circuit diagram illustrating a suitable power circuit for a symmetrical optically reconfigurable branching unit employing the optical circuit in FIG. 3 constructed in accordance with the invention.

FIG. 4 illustrates a suitable power circuit for control of a symmetrical optically reconfigurable branching unit employing the optical circuit of FIG. 3. To a large extent, this functions as does that of the prior art, shown in FIG. 1. Relay coils 30,32,34 are each provided within rectifier diode bridges 36,38,40. These bridges 36,38,40 ensure that no matter which direction the current flows between branches through the branching unit the coil energising current is always unipolar and it also helps to increase relay drop out time via the flywheel effect.

One pair of rectifier diodes is associated with each branch cable terminal. The circuit also includes three two pole relays having coils RA, RB and RC which in contradistinction to the prior art are double-contact and two single pole double contact relays having coils RD and RE rather than one as in the prior art. The designations RAC, RBC etc refer to a contact of the relevant relay, and suffixes 1 and 2 refer to the first and second poles of the respective relays.

The three bridges 36,38,40 are connected via relay contacts RAC2, RCC2, and RBC2 when closed in a series arrangement 36 to 38 to 40. 40 is coupled back to 36 to form effectively a delta configuration.

There are four zener diodes 42,44,46,48 connected in series which, as in the prior art, can be used to feed other electrical circuits in the branching unit, e.g. amplifiers and associated electronics. The series arrangement of the four zener diodes is effectively connected in parallel with each relay coil RA, RB, RC. Three pairs of rectifier diodes 50,52 and 54,56 and 58,60 conducting in the same directions, are disposed in parallel with the series connection of the zener diodes 42,44,46,48.

The junction 62 to which both relay coils RB and RC are connected is between the rectifier diodes 50 and 52, the junction 64 between the coils RB and RA is connected to a point between the rectifier diodes 54 and 56, and the junction 66 to which both coils RA and RC are connected is between the rectifier diodes 58 and 60. Associated with each coil RA, RB, RC is one pair of the pairs of rectifier diodes, 50 and 52, 54 and 56, 58 and 60. For example, coil RC is associated with diode pairs 58,60 and 50,52 and the four diodes of these two pairs are arranged as a rectifier bridge. The branch terminals A and B and the coil RC are connected across one pair of the bridge's terminals and the zener diodes 42,44, 46,48 are connected across the other pair of the bridge's terminals. The point 62 is connected via a surge protection coil 68 to one pole of contacts RAC1 of relay RA which in its normal state connects to the input of branch A. Similarly, point 64 is connected via a surge protection coil 70 to one pole of contact RRC1 of relay RC which in its normal state connects to the input of branch C, and point 66 is connected via a surge protection coil 72 to one pole of contact RBC1 of relay RB which in its normal state connects to the input of branch B. The other pole of each relay contact RAC1, RBC1 and RCC1 is connected to a common line 74. The line 74 is coupled via a parallel arrangement of a zener diode 76 and relay coil RE to one pole of a relay contact RDC1 which in the normal state is open circuit but which when relay coil RD is operated is connected to a sea earth 75.

The second pole of each relay contact RAC2, RBC2 and RCC2 is coupled via series arrangements of coils 10,12, 14,16 and 18,20 respectively, of the optical switching devices shown in FIG. 3, to a common line 77 which is coupled via the normally closed contacts REC1 of relay RE to the junction of diodes 52,56,60. Its switch acts as an inhibit switch.

In operation, when a voltage is applied between two branches such that, for example, current flows from branch A to branch B, terminal C is connected to sea earth 75. In addition, current flows through junction 62 through rectifier diode 50, the series connections of the zener diodes 42,44, 46,48 and rectifier diode 60 to junction 66 and thence to branch B. Hence the internal power circuits provided by the zener diode chain are effectively put in series between the branch through which current is being supplied—A–B in this example.

If current flow is from branch A to branch C and terminal B is connected to sea earth 77 when contacts RDC1 are changed over, current flows through rectifier diode 50, the zener diode chain 42,44,46,48 and rectifier diode 56 to junction 64 and thence to branch C. If current flow is from branch C to branch B and branch A is connected to the sea earth when contacts RDC1 are changed over, the current flows from C through the rectifier diode 54, zener diode chain 42,44,46,48 and rectifier diode 60 to junction 66 and thence to branch B. If the current flow is reversed, e.g. the flow is from branch B to branch C, current flows from junction 66, through rectifier diode 58, the zener diode string 42,44,46,48 rectifier diode 56 to junction 64 and thence to branch C. The arrangement is symmetrical and reversible and achieves the requirement of supplying current to the zener diode string irrespective of the current flow direction.

The relays RA, RB, RC are switched in dependence upon voltage and accordingly for example when current feed is between A and B relay coil RC will experience double the voltage of the coils RA and RB which means that the relay RC is capable of switching its contact but RA and RB are not.

It will be appreciated that the electrical switching function of FIG. 4 which enables power supply between any two of the three branches also energizes through the contacts RAC2, RBC2 and RCC2 particular coils of the six optical switches 12,10 or 14,16 or 18,20, such that when the branching unit is powered between any two branches with a specific polarity, all of the optical fibres will also be routed between those branches. For example, if the line current flows (in the conventional sense) from branch B to branch A thereby causing RC to operate, RCC1 connects branch C to 74, as described earlier. In addition, RCC2 connects branch B electrically to optical switch coils 18 and 20, and because branch B is electrically positive relative to 78 (the "negative end" of the zener diode chain 42–48), the optical switches are activated and branch C is bypassed optically. If, on the other hand, current flows from branch A to branch B, RCC2 still connects branch B electrically to optical switch coils 18 and 20, but this time the optical switches do not operate because branch B is at the same voltage as 78, and so the optical configuration remains in the default state. Since the circuit in FIG. 4 has three-fold symmetry, it will be readily seen that powering with current flow from branch A to branch C will bypass branch B optically, whereas current flow from branch C to branch A will not, and powering with current flow from branch C to branch B will bypass branch A optically whereas current flow from branch B to branch C will not. Therefore, if the earthed branch is unpowered for any reason (e.g. there is a system fault, or traffic in that branch is not required), this circuit gives the option of bypassing it optically or not, by choosing the sense of the power feed current.

Powering of the earthed branch with negative feed (the usual practice) activates the coil of RE, so that the contacts REC1 disconnect 77 from 78, de-powering the optical switches and thereby reverting to the default optical condition. If it is required to power the earthed branch while maintaining the optical bypass (e.g. for optical measurements during a repair of the earthed branch but when full traffic is still required on the other two branches), this can be done by positive powering of the earthed branch, which causes RE to be bypassed by zener diode 76 acting as a normal diode, so that REC1 remains in the default condition and the optical switch coils are not disconnected from 78.

A complete summary of branching unit optical configurations with line current routeing is shown in FIG. 5 (total of 13 power and 4 optical). FIGS. 5a, 5b, 5c, 5d refer to the four optical routeing configurations in column x and the powering configurations to achieve them in column y; in column y dotted lines show un-powered lines. So the first optical configuration in column x, i.e. FIG. 4a (the default one), is achieved by the nine different powering configurations indicated in column y. For example, if current is passed from A to B then the default configuration is achieved. If the other branch or spur also passes current then there will be no change in the optical configuration.

Each of the other three optical configurations may only be achieved when powering between two branches or spurs with the third switched off. So reversing this example and passing current from B to A with no current in C will achieve all fibres routed A to B; again, dotted lines indicate no power, full line indicates line current flowing.

Figure 6:
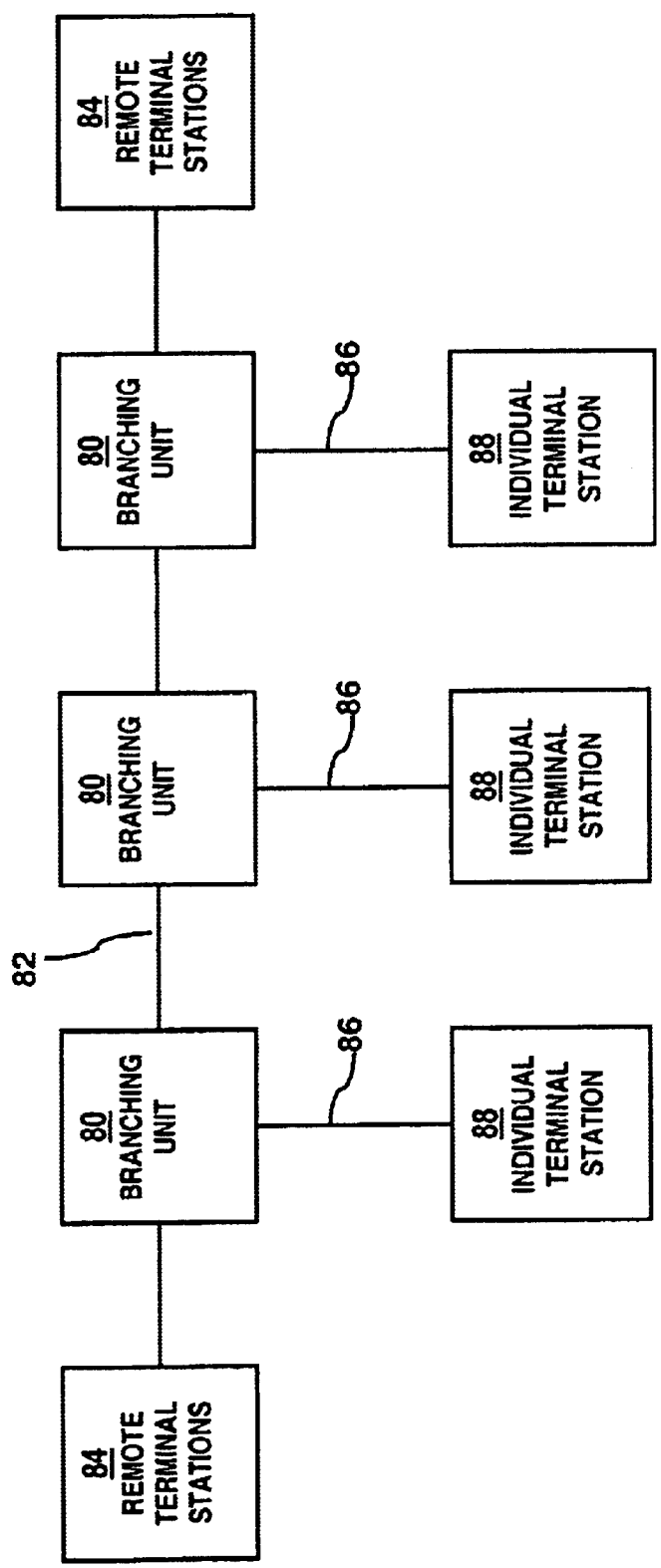
FIG. 6 is a schematic illustration of an optical transmission system constructed in accordance with another aspect of the invention and employing branching units in accordance with the invention.

FIG. 6 illustrates schematically an optical transmission system comprising a plurality of branching units 80, such as those previously described, spaced apart along a trunk cable 82 which connects remote terminal stations 84. The branching units are linked via optical fibre spur cables 86 to individual terminal stations 88. The trunk cable and spur cables incorporate an electrical conductor for supplying power from the terminal stations to the branching units and to permit switching of optical switching devices in the branching unit to selectively couple inputs/outputs of different branches in dependence upon the way in which the branches are provided with an electrical power feed. This provides a system in accordance with a second aspect of the invention.

The system described as a number of advantages:
1. Simple existing power switching control can be maintained.
2. Simple optical switching control is incorporated with traffic routeing following line current.
3. Optical switches are inherently robust and are inherently surge protected by the branching unit.
4. Low optical loss of the order of 1db port to port.
5. Optical faults on any spur can be avoided by re-routeing.
6. The optical system is retro-fittable to existing power control systems.
7. Selective traffic routeing - system operators could redirect traffic at peak times by turning off spurs.

What is claimed is:
1. A branching unit for underwater optical communication, comprising:
   three branches connected to respective optical cables, wherein each of said optical cables contains at least one pair of optical fibres, a plurality of optical switches, wherein each of said three branches has at least one of said switches, and means for actuating respective ones of the optical switches into or isolated from respective circuits in accordance with an overall powering condition in the respective optical cables, and wherein each of said means for actuating respective ones of the optical switches further enables selective power supply to or from said circuits in accordance with said overall powering condition.

2. A branching unit according to claim 1, wherein the optical switches are arranged to offer, according to their state, alternative paths through the switch to two pairs of optical fibre lines in each branch.

3. A branching unit according to claim 1, wherein there are provided two of said optical switches for each branch, each having four input/outputs, the first and second of which are optically coupled to a different one of the optical input/outputs of the branch and the third and fourth of which are optically coupled to a third input/output of different ones of the optical switches of the other two branches such that the optical switches can selectively optically couple each input and output for said fibre pair line of one branch to a corresponding output and input of either one of the other branches.

4. A branching unit according to claim 1, wherein said branching unit has a default configuration in which in each of said branches each pair of input/outputs for a fibre pair are coupled to the output/inputs for a fibre pair of a different one of the other two branches.

5. An underwater optical communication system, comprising an optical fibre trunk cable coupled between remote terminal locations and provided with a plurality of branching units at spaced locations therealong, wherein said branching units are linked via optical fibre cable to individual terminal locations, and wherein the optical fibre trunk cable and optical fibre linking cable incorporates an electrical conductor for supplying power from the terminals to the branching units, and wherein at least one of the branching units is as defined in claim 1.

6. The branching unit of claim 1, wherein each of said means for actuating comprises a relay associated with a respective one of each of said branches.

7. A branching unit for submarine optical communication systems, said unit comprising:

three branches, wherein each includes connection for a power feed and a plurality of paired inputs and outputs for respective pairs of optical fibre lines, and optical switching means for selectively coupling the inputs and outputs of different of said branches to enable routeing of optical signals through the unit between different of said branches in dependence upon which ones of the three branch connections are provided with an electrical power feed, and wherein said optical switching means also further enables selective power supply routein through said unit.

8. A branching unit according to claim 7, wherein each of said branches comprises four inputs/outputs for connection of two fibre line pairs and the optical switching means permits selective coupling of all four input/outputs of one branch in pairs to corresponding output/inputs of either one of the other branches.

9. A branching unit according to claim 7, wherein selective switching of the optical switches changes between a first configuration where all four inputs/outputs of a first branch are coupled to corresponding output/inputs of a second branch and a second configuration where two inputs/outputs of the first branch are coupled to two corresponding outputs/inputs of a third branch and the other two input/outputs of the first branch are coupled to two corresponding outputs/inputs of the second branch can be effected in dependence upon the direction of current feed between first and second branches.

10. A branching unit according to claim 7, wherein said branching unit has a default configuration in which in each of said branches each pair of input/outputs for a fibre pair are coupled to the output/inputs for a fibre pair of a different one of the other two branches.

11. An underwater optical communication system, comprising an optical fibre trunk cable coupled between remote terminal locations and provided with a plurality of branching units at spaced locations therealong, wherein said branching units are linked via optical fibre cable to individual terminal locations, and wherein the optical fibre trunk cable and optical fibre linking cable incorporates an electrical conductor for supplying power from the terminals to the branching units, and wherein at least one of the branching units is as defined in claim 3.

* * * * *